United States Patent [19]

Workman

[11] 4,452,096

[45] Jun. 5, 1984

[54] ENERGY ABSORBING STEERING COLUMN AND CAPSULE MOUNTING THEREFORE

[75] Inventor: Michael J. Workman, Sunfield, Mich.

[73] Assignee: General Motors Corporation, Detroit, Mich.

[21] Appl. No.: 294,452

[22] Filed: Aug. 20, 1981

[51] Int. Cl.³ .............................................. B62D 1/18
[52] U.S. Cl. ..................................... 74/492; 280/777; 280/779
[58] Field of Search ................. 74/492, 493; 280/777, 280/779, 780

[56] References Cited

U.S. PATENT DOCUMENTS

| | | | |
|---|---|---|---|
| 3,621,732 | 11/1971 | Kaniut | 74/492 |
| 3,899,937 | 8/1975 | Nagazumi | 74/492 |
| 4,102,217 | 7/1978 | Yamamoto et al. | 74/492 |
| 4,241,937 | 12/1980 | Eggen | 280/777 |
| 4,274,299 | 6/1981 | Jones | 74/492 |

Primary Examiner—Allan D. Herrmann
Attorney, Agent, or Firm—Charles R. White

[57] ABSTRACT

Mounting for telescopic energy absorbing steering column for vehicles in which a guide bracket carries column release capsules on opposite sides of the column and has vertically oriented tongue and groove slide connection with column mounted capsule bracket for optimized column mounting stiffness and improved column guidance on release.

3 Claims, 3 Drawing Figures

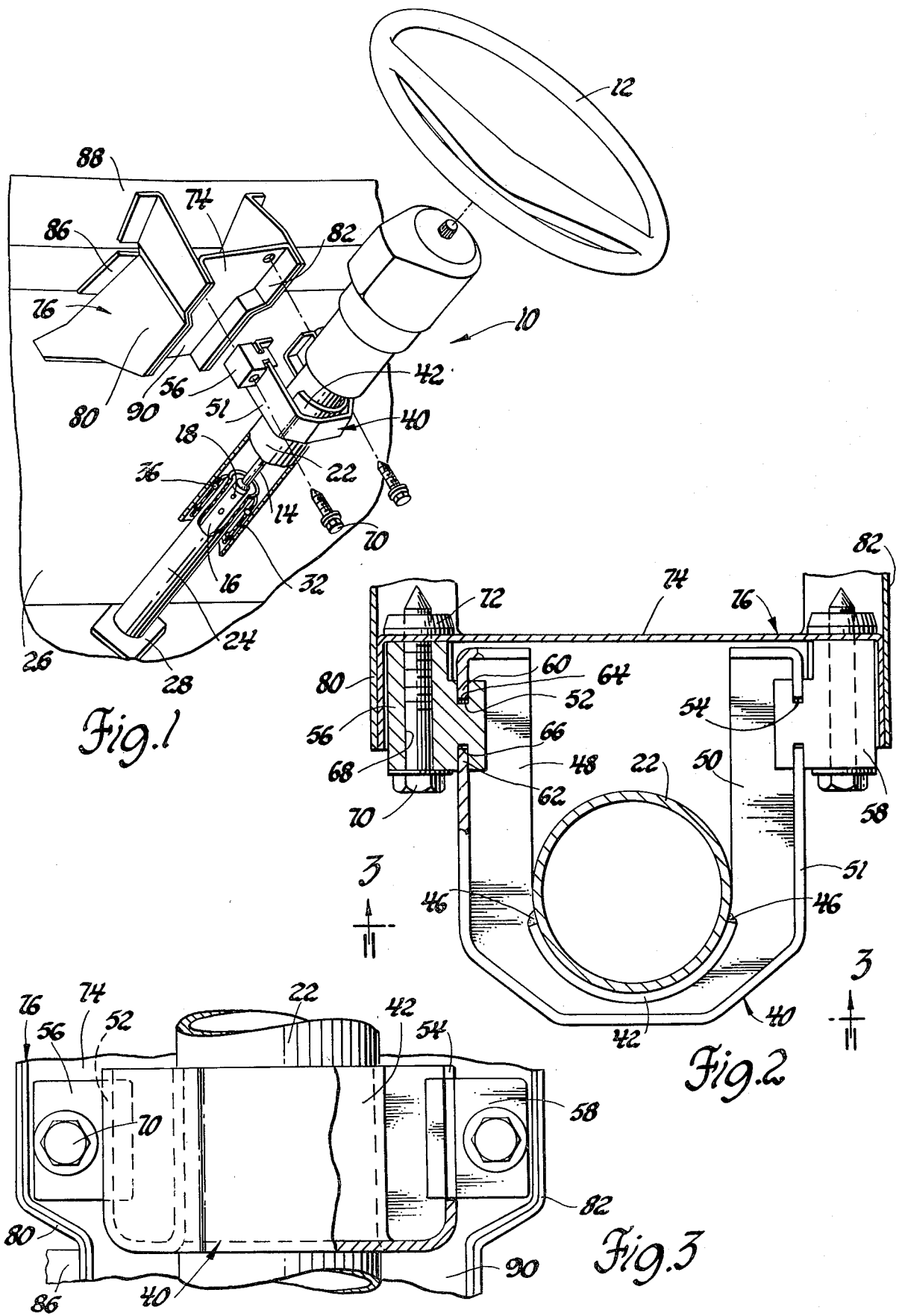

ENERGY ABSORBING STEERING COLUMN AND CAPSULE MOUNTING THEREFORE

This invention relates generally to vehicle steering columns and more particularly to new and improved capsule mounting releasably supporting a telescopic or collapsible energy absorbing steering column in a vehicle which provides for stabilized column support for a wide range of vehicle operating conditions and for full and effective column release in energy absorption operation.

Prior to the present invention, telescopic or collapsible energy absorbing steering columns for vehicles have been supported by special bracket and cooperating column mounting and release capsules that provide for effective steering column support in normal use and full and efficient release of the column from supporting structure under predetermined force loading on the column. While most of these prior column mountings provide for good support and for effective release when required, column vibration and shake occured in some columns when the vehicle employing such construction is driven over very bumpy terrain, irregular roads, or has a rough operating engine.

With this invention there is a vertical orientation of the capsule release bracket and cooperating release capsule to provide improved column mounting stiffness as opposed to the bending or flexibility of the horizontal flanges of some prior constructions. The vertical attachment of the release capsules while sharply reducing column vibrations also provides for optimized column attachment or for teardown for repair of the column if required. This invention preferably incorporates a pair of release capsules on opposite sides of a steering column assembly with axially slidable tongue and groove interconnection with column mounted capsule bracket construction. The capsules are retained in position by vertical drive fasteners for the improved assembly of the steering column to supporting guide bracket structure within the vehicle. In the preferred embodiment of this invention, the capsule bracket is secured to the steering column and moves with the column during telescopic column movement. Furthermore, such movement is guided and channeled by the guide bracket. Preferably, the capsules are die cast aluminum members secured to the capsule bracket with injected plastic at their interface for improved retention.

It is a feature, object and advantage of this invention to provide a new and improved energy absorbing steering column in which release capsules and cooperating support bracket structure on opposed sides of the column have cooperating vertically oriented tongue and groove releasable attachment means to reduce steering column shake from vehicle vibrations.

It is another feature, object and advantage of this invention to provide a new and improved energy absorbing steering column incorporating telescopic tubular members which have an energy absorbing function and in which vertically oriented capsule release devices normally rigidly supports the steering column in normal operation and which provides for quick and efficient release of the column on the application of a predetermined impact load thereto.

These and other features, objects and advantages of this invention will be more apparent from the following detailed description and drawing in which:

FIG. 1 is a perspective and exploded view with parts broken away of a preferred embodiment of this invention.

FIG. 2 is a cross-sectional view of a preferred embodiment of this invention showing details of the capsule mounting and its relationship to the collapsible steering column.

FIG. 3 is a view taken along lines 3—3 as viewed in the direction of the indicator arrows.

Turning now in greater detail in the drawing, there is shown in FIG. 1 a steering column assembly 10 for a steerable wheeled vehicle. This assembly has a manual steering wheel 12 operatively connected to the upper end of a centralized steering shaft assembly having elongated and telescopic shaft members 14 and 16 secured together by shear pins 18. Disposed around the steering shaft assembly is a mast jacket assembly which basically includes upper and lower telescopically related cylindrical steel jacket sections 22 and 24. The lower cylindrical jacket section is fixed to a front bulkhead 26 of the vehicle by an anchor plate assembly 28 which is operative to retard movement of the lower cylindrical jacket section 24 in either axial direction under axial input thrust load applied to the mast jacket from conventional steering gear in front of the bulkhead 26 or from the steering wheel 12.

The upper and lower cylindrical jacket sections 22 and 24 are assembled to have a portion of the lower and smaller diameter section telescopically received a predetermined distance within the upper and larger diameter cylindrical section. Operatively mounted between the cylindrical sections of the mast jacket assembly is a plastic sleeve 32 providing a carrier for a plurality of spherical steel balls 36 held captive in circular apertures formed therein. These steel balls are sandwiched between the walls of the two jacket sections with a predetermined interference fit and have an elevated hardness relative to that of either or both cylindrical sections so as to be operative to deform the walls thereof during forced telescopic movement as a result of an upper and axial force applied thereto to dissipate energy by localized plastic strain deformation or "grooving" caused by the balls as the two sections of the mast jacket are telescoped together.

Releaseably supporting the upper jacket section for the described energy absorbing telescoping movement are specialized brackets and release capsule construction to which this invention is drawn.

In the preferred embodiment, there is a generally U-shaped sheet metal capsule bracket 40 having an upwardly extending internal flange 42 which provides an internal U-shaped yoke portion to which jacket section 22 is secured by welds 46. The bracket 40 has laterally spaced flat arms 48, 50 and has an outer perimeter formed by U-shaped outer wall 51. This outer wall 51 is slotted at 52 and 54 to provide aligned tongues which are slidably received in associated grooves formed left and right capsules 56 and 58, preferably made of die cast aluminum. Such tongue and groove fitting provides a linear multi-point connection releasable under set impact loads.

The tongues provided by the wall 51 for capsule 56 are identified by numerals 60 and 62 which are vertically spaced from one another and which are slidably received in corresponding vertical grooves 64 and 66 in an inboard section of the capsule 56. This capsule has a main body formed with a vertical opening 68 parallel and laterally offset from slot 52 therein through which attachment screw 70 extends. Screw 70 is threaded into a nut 72 welded or otherwise fixed to the upper side of a web portion 74 of a sheet metal steering column guide bracket 76 which is secured to support structure within the vehicle as will be described hereinafter. The capsule 58 is a mirror image of capsule 56 and the attachment to the capsule bracket 40 and the guide bracket 76 is substantially the same as described in connection with the capsule 56.

As shown by the drawing, the guide bracket 76 has left and right hand side walls 80 and 82 which are disposed on either side of the steering column and capsule bracket 40 secured to the steering column. These walls provide guides to optimize telescopic movement of the jacket section 22 and 24 when the steering wheel 12 is loaded with a predetermined axial load. The guide bracket 76 is formed with laterally extending flanges 86 bent over from the sides thereof which are welded or otherwise secured to instrument panel 88 or other structure within the body of the vehicle.

In the event that the column 10 is telescoped inwardly, the capsules 56 and 58 are retained in position by the associated threaded fasteners while the tongue and groove connection between the capsules and the capsule bracket allow the linear stroking movement of the jacket section on jacket 22 with respect to the jacket section 24. The telescoping steering shaft causes the sheering of the pin 18 and the balls 36 deform the metal of the jacket assembly to absorb impact energy as previously described.

Importantly, with this invention, the left and right capsule brackets are supported by the vertically oriented tonque and groove connection which provides stiffness for improved column support since it does not flex as does the laterally extending connections of many prior art constructions such as when rough roads and rough engine idle are experienced. Under such severe vibration conditions, the vertically oriented tongue and groove connection and the close fitting of these connections reduce the tendency of the column to vibrate in any plane and especially the vertical and horizontal planes as would be the case with many prior art constructions. This invention while providing for such improved stiffness also provides the quick and easy method of assembly and teardown for repair if needed. Easy access is provided for assembly and disassembly by the vertically oriented threaded fasteners so that the column, the capsule bracket, and the capsule can be easily moved from the guide bracket. In the preferred design, the guide bracket is narrowed to provide a channel 90 in which the capsule bracket and attached column is guided on collapse for improved performance in absorbing energy.

While a preferred embodiment of this invention has been shown and described to illustrate the invention, other embodiments will become more apparent from the specification, claims and drawings. Accordingly, the scope of this invention is set forth in the following claims.

The embodiments of the invention in which an exclusive property or privilege is claimed are defined as follows:

1. A telescopically collapsible steering column for an automotive vehicle comprising a steering shaft operatively connected between a vehicle steering gear at a lower end thereof and a manually operated steering wheel at the upper end thereof, a support jacket disposed around said steering shaft, said column having energy absorbing means therein for dissipating energy as said jacket and said shaft are telescopically collapsed on application of a force of predetermined magnitude to said steering wheel, a column support fixed within said vehicle, attachment means operatively mounting said jacket to said support, said attachment means comprising capsule means and cooperating vertically extending threaded fastener means fastening said capsule means to said support, said jacket having a bracket secured thereto, said bracket and said capsule means having cooperating vertically oriented upper and lower tongue and groove retention means tight-fitting and laterally offset to one side of said anchor means, said tongue and groove retention means provides a multiple point attachment of said column to said vehicle for optimized column mounting stiffness and minimized column vibration in response to operation of said vehicle and which slidably releases said bracket and said column from connection with said support so that said column can telescopically collapse and absorb energy in response to application of an impact load on said steering column, said column support having spaced side walls outboard of said bracket forming an elongated guide channel which guides said bracket and said steering column in a predetermined path as said column is telescopically collapsed to optimize operation of said energy absorbing means.

2. A telescopically collapsible steering column for an automotive vehicle comprising a steering shaft operatively connected between a vehicle steering gear at a lower end thereof and a manually operated steering device at the other end thereof, a support jacket rotatably supporting said steering shaft, said column having energy absorption means therein for absorbing energy as said jacket and said shaft are telescopically collapsed on application of a force of predetermined magnitude to said steering device, a column support fixed within said vehicle, attachment means operatively mounting said jacket to said support, said attachment means comprising a capsule and capsule mounting bracket and vertically oriented anchor means extending through said capsule to secure said capsule to said support, fastening means securing said bracket to said jacket, said capsule having vertically oriented grooves formed in upper and lower sides thereof and offset to one side of said anchor means, said bracket having vertically oriented upper and lower tongues respectively mounted for linear sliding movement in said upper and lower grooves, said attachment means being operative to normally mount said column to said vehicle for optimized stiffness and minimized vibration in response to operation of said vehicle and to slidably release said column from said support for absorption of energy in response to application of an impact load on said steering column, said column support having spaced side walls vertically oriented and outboard of said column to form a guide channel to guide said bracket and said jacket in a predetermined path to thereby control the telescopic collapse of said column to thereby optimize operation of said energy absorbing means.

3. A telescopically collapsible energy absorbing steering column for an automotive vehicle comprising a telescoping steering shaft operatively connected between a vehicle steering gear at a lower end thereof and a manually operated steering wheel at the other end thereof, a support jacket rotatably supporting said steering shaft, said column having energy absorption means permitting said jacket and said shaft to be telescopically collapsed on the application of a force of a predetermined magnitude to said steering wheel, a column support fixed within said vehicle, attachment means operatively mounting said jacket to said support, said attachment means comprising first and second capsules laterally spaced from one another, a bracket secured to said jacket, vertically extending anchor means fastening said capsules to said support, each of said capsules having vertically oriented grooves formed in upper and lower sides thereof, said bracket having laterally spaced sides, each side having first and second laterally spaced and rearwardly open recesses therein respectively associated with said first and second capsules, each of said recesses being defined by upper and lower tongues which face one another, said upper and lower tongues of each recess closely fitted in respective upper and lower grooves of each capsule to provide multiple point retention of said capsules for optimized column mounting stiffness and minimized column vibration in response to operation of said vehicle, said capsules providing the slidable release of said column from said support so that said energy absorption means can be operative to dissipate energy effecting the collapse of said steering column, said support having laterally spaced side walls which form a guide channel therebetween which slidably receives and guides said bracket and said jacket in a fixed path to control the telescopic collapse of said column to optimize the effectiveness of said energy absorbing means in absorbing energy.

* * * * *